(12) United States Patent
Hoppe et al.

(10) Patent No.: US 8,978,697 B2
(45) Date of Patent: Mar. 17, 2015

(54) FILTER ELEMENT AND CONTROL VALVE FOR A CAMSHAFT ADJUSTMENT SYSTEM

(75) Inventors: Jens Hoppe, Erlangen (DE); Stefan Konias, Erlangen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 63 days.

(21) Appl. No.: 13/046,983

(22) Filed: Mar. 14, 2011

(65) Prior Publication Data

US 2011/0226204 A1    Sep. 22, 2011

(30) Foreign Application Priority Data

Mar. 18, 2010 (DE) .................. 10 2010 011 834

(51) Int. Cl.
*E03B 7/07* (2006.01)
*B01D 29/01* (2006.01)
*B01D 29/11* (2006.01)
*F01L 1/344* (2006.01)

(52) U.S. Cl.
CPC ............ *B01D 29/014* (2013.01); *B01D 29/112* (2013.01); *F01L 1/344* (2013.01); *F01L 2001/34426* (2013.01); *F01L 2001/3444* (2013.01); *F01L 2101/00* (2013.01); *F01L 2103/00* (2013.01)
USPC .................. 137/550; 137/625.25; 137/625.65

(58) Field of Classification Search
USPC .................. 137/544, 545, 625.25, 625.65
See application file for complete search history.

(56) References Cited

U.S. PATENT DOCUMENTS

| | | | |
|---|---|---|---|
| 5,102,436 A | 4/1992 | Grabowski | |
| 5,169,524 A * | 12/1992 | Meiritz et al. | 210/232 |
| 5,482,622 A | 1/1996 | Stark et al. | |
| 5,807,483 A * | 9/1998 | Cassidy et al. | 210/232 |
| 6,484,014 B1 * | 11/2002 | Koszarsky | 455/86 |
| 6,648,014 B1 * | 11/2003 | Takahashi et al. | 137/545 |
| 6,848,404 B2 * | 2/2005 | Maeyama et al. | 123/90.17 |
| 7,041,217 B1 | 5/2006 | Close et al. | |
| 2003/0006182 A1 | 1/2003 | Gutierrez | |
| 2003/0226593 A1 * | 12/2003 | Okada et al. | 137/550 |
| 2005/0011703 A1 * | 1/2005 | Yamaguchi | 184/6.9 |
| 2006/0021933 A1 * | 2/2006 | Radcliffe | 210/483 |
| 2008/0202605 A1 * | 8/2008 | Choi | 137/544 |

FOREIGN PATENT DOCUMENTS

| | | |
|---|---|---|
| DE | 200 23 304 U1 | 9/2003 |
| DE | 10 2008 049 052 A1 | 4/2009 |
| EP | 1 921 359 A1 | 5/2008 |
| JP | 2007232127 A | 9/2007 |
| WO | 2006/136258 A1 | 12/2006 |
| WO | 2008/034879 A1 | 3/2008 |
| WO | 2008/040741 A1 | 4/2008 |

* cited by examiner

*Primary Examiner* — Craig Schneider
*Assistant Examiner* — Angelisa Hicks
(74) *Attorney, Agent, or Firm* — Davidson, Davidson & Kappel, LLC

(57) ABSTRACT

A filter element for a control valve of a camshaft adjuster. The filter element has an annular filter fabric for extracting particles, and a gripping frame for fastening the annular filter fabric. The gripping frame is designed here for the planar bracing of the annular filter fabric on the control valve. Furthermore, a control valve is disclosed for a camshaft adjuster with a corresponding filter element.

12 Claims, 7 Drawing Sheets

FILTER ELEMENT AND CONTROL VALVE FOR A CAMSHAFT ADJUSTMENT SYSTEM

This application claims the priority of DE 10 2010 011 834.6 filed Mar. 18, 2010, which is incorporated by reference herein.

FIELD OF THE INVENTION

The invention relates to a filter element for a control valve of a camshaft adjuster, comprising a filter fabric for extracting particles, and a frame for fastening the filter fabric. Furthermore, the invention relates to a control valve for a camshaft adjuster with an abovementioned filter element.

BACKGROUND OF THE INVENTION

A camshaft adjuster serves for the targeted adjustment of the phase position between a camshaft and a crankshaft in an internal combustion engine and thus permits optimized setting of the valve timings. By this means, for example, the performance of an internal combustion engine can be increased or the consumption can be reduced.

A camshaft adjuster has a stator which is connected to the crankshaft for rotation therewith, and a rotor which is retained in said stator. The rotor is connected to the camshaft in turn for rotation therewith and can be adjusted with respect to the stator. The adjustment of the rotor is brought about by charging pressure chambers formed in the stator with a hydraulic fluid, such as oil. The charging is ensured via a pressure line communicating with the pressure side of the oil supply system. The oil is pumped here by means of a pump from an oil reservoir within the engine oil circuit via the pressure line into the pressure chambers of the camshaft adjuster and can therefore be used for adjusting the camshaft.

In the process, the oil may be contaminated with particles which arise, for example, due to abrasion of moving components during operation of the internal combustion engine. The contaminated oil may be transported via the control valve into the pressure chambers of the camshaft adjuster and may be deposited there. This may result in restricted operation or even to failure of the camshaft adjuster.

In order to prevent this, use is made of filter elements which extract particles from the oil prior to entry into the control valve or the pressure chambers. Filter elements customarily consist of a filter fabric retained within a frame. A filter element of this type is known from WO 2006/136258 A1. The filter element is formed integrally with a filter fabric and a frame and is positioned fixedly in an annular groove on a control valve. The filter fabric is cast into the frame during production of the latter. In other words, the filter fabric and the frame are connected fixedly to each other.

The drawback of this is, if the frame is damaged, the filter fabric is also damaged and therefore loses its filter effect. A cast filter fabric therefore does not constitute a permanent solution as a particle filter for a control valve.

SUMMARY OF THE INVENTION

Accordingly, it is a first object of the invention to provide a filter element which has an extended service life as compared with the prior art.

It is a second object of the invention to provide a control valve with an abovementioned filter element, wherein the operability of the control element and therefore the disturbance-free operation of a camshaft adjuster is ensured for a longer period of time.

The first object of the invention is achieved according to the invention by a filter element for a control valve of a camshaft adjuster comprises an annular filter fabric for extracting particles, and a gripping frame for fastening the annular filter fabric. Provision is made here for the gripping frame to be designed for the planar bracing of the annular filter fabric on the control valve.

The invention takes into consideration here the fact that, in a single-piece filter element, damage to the frame, for example if incorrectly fastened to a control valve, may result in destruction of the filter fabric. The forces acting on the frame are transmitted directly to the annular filter fabric, and therefore, if the frame is destroyed, the filter function of the filter fabric can also no longer be ensured.

The invention solves this problem by separating the retaining function of the frame from the filter function. By means of this separation, when force is applied to the frame, direct transmission of said forces to the filter fabric can be prevented, and therefore the filter effect can be maintained. In other words, the retaining function of the filter element on a control valve is decoupled from the filter function or the cleaning function of the filter element. Contrary to the filter elements used previously, the filter element is supported by the planar bracing of an annular filter fabric on a control valve by means of the embracing gripping frame.

The annular filter fabric can be attached together with the gripping frame on a control valve. This may, for example, take place simultaneously if the filter fabric is already inserted into the gripping frame prior to being attached. As an alternative, the annular filter fabric may also be positioned on the control valve first and finally embraced by the gripping frame.

In principle, various possibilities resulting in the planar bracing of the annular filter fabric on the control valve are conceivable. The gripping frame is advantageously of substantially annular design for this purpose. This configuration is obvious, since the control valves are in particular control valves with tubular housings. Accordingly, the gripping frame can be positioned precisely on the control valve with the annular filter element being braced. If the spring prestress of the gripping frame is of a sufficient magnitude in order to prevent the gripping frame from slipping off the control valve, it is possible for, for example, an additional fastening of the ends of the gripping frame to be omitted.

In order to achieve sufficient bracing if the inherent spring prestress of the gripping frame is lower, the gripping frame is preferably designed with two ends which extend in the circumferential direction and can be connected to each other in different ways. The annular filter fabric can thereby be retained on the control valve by the gripping frame and braced by the ends being connected.

In an advantageous refinement of the invention, the gripping frame is designed with two ends which extend in the circumferential direction and can be interlocked. An interlockable connection can be realized, for example, by two ends bent over radially, wherein one end is bent radially outwards and the second end is bent radially inwards. The ends can be brought into contact with each other by the gripping frame being pressed together and finally can be interlocked.

In a preferred refinement of the invention, the ends of the gripping frame can be connected to each other by a fastening means. In this case, the ends are in particular both bent radially outwards such that the ends can be connected to each other via the fastening means. For this purpose, the fastening means can be designed, for example, as a wire clip in which the bent-over ends of the gripping frame each interlock. This refinement provides, for example, the possibility of releasing the connection at the ends of the gripping frame if the need arises.

In another advantageous refinement of the invention, the gripping frame is designed with two ends which extend in the circumferential direction and can be caulked to each other. By means of a caulked connection between the ends of the gripping frame, a frictional and form-fitting connection is produced by means of plastic deformation. The edge region of at least one of the parts is deformed in such a manner that the parts wedge the ends in particular nonreleasably one inside the other. For this purpose, the gripping frame can be specially designed with two ends which overlap in the circumferential direction such that the ends can be caulked to each other in a simple manner. Metals in particular are suitable for caulking.

The gripping frame is advantageously of substantially annular design with two ends which extend in the circumferential direction and can be welded to each other. The ends of the gripping frame can thus be connected nonreleasably to each other with the use of heat or pressure. In this case, said ends are, for example, heated until they liquefy and are thus connected.

The gripping frame is expediently designed as an in particular metallic clip having a number of openings provided over the circumference of the clip. The clip provides the necessary support and, in the case of a metal, sufficient prestress for the retaining and bracing of the annular filter fabric in a planar manner on a control valve. A metallic material supplies the necessary elasticity of the gripping frame. As an alternative, suitable plastics are also conceivable. In particular, the openings are provided at those locations in the gripping frame or in the clip where the filter element overlaps with the openings of the control valve. The oil can therefore flow through the filter fabric without an unnecessary loss of pressure.

In another advantageous refinement of the invention, the gripping frame is designed as a metallic mesh, the mesh size of which is wider than the mesh size of the annular filter fabric. In other words, the fine-meshed fabric is retained by the wide-meshed fabric of the gripping frame. The wide-meshed gripping frame ensures that the annular filter fabric is supported securely. It is in principle also possible for the mesh having the wide mesh size and for the fine-meshed annular filter fabric to be connected to each other in this manner. In this case, the mesh having the wide mesh size serves as a support for the fine-meshed annular filter fabric. By connection of the mesh to the annular filter fabric, both parts can be attached together on a control valve preferably in one installation step.

The second object of the invention is achieved according to the invention by a control valve which has a tubular valve housing and a control piston arranged in the valve housing. The valve housing is designed with a radial hydraulic fluid passage opening, and a filter element for the control valve of a camshaft adjuster, which has a filter fabric for extracting particles, and a retaining frame for fastening the filter fabric, where the filter fabric is an annular filter fabric and the retaining frame is a gripping frame for the planar bracing of the annular filter fabric on the control valve. The annular filter fabric is braced in a planar manner here on the valve housing within the gripping frame.

Accordingly, secure support of the annular filter fabric on the control valve or the valve housing is ensured. The retaining function of the filter element on the control valve is decoupled here from the filter function of the filter element.

As already mentioned at the beginning, the control valve serves to meter the oil for the operation of a camshaft adjuster. The control valve is customarily designed as an electromagnetic control valve which consists of an electromagnet with an electric plug-in contact and a piston which is accommodated in the valve housing. The electric plug-in contact can be connected in particular to a control module via which the control valve is regulated. With the aid of the control valve, the supply of oil to and removal of oil from the pressure chambers of a camshaft adjuster can be adjusted.

When a current is applied to the electromagnet of the control valve, said electromagnet displaces the internal control piston of the control valve and thereby pressure chamber which is not charged in each case with oil pressure is connected to a connection for the oil return, via which the oil can be supplied again to the engine oil circuit. To ensure that the oil is clean, the filter element is arranged radially around the passage opening such that the oil which passes into the control valve and therefore into the pressure chambers of the camshaft adjuster is cleansed of dirt particles.

BRIEF DESCRIPTION OF THE DRAWING

Exemplary embodiments of the invention are explained in more detail below with reference to a drawing, in which.

DETAILED DESCRIPTION OF THE INVENTION

FIGS. 1 to 6 each show a different configuration of a filter element with an annular filter fabric for extracting particles and with a gripping frame for fastening the annular filter fabric. In addition, FIGS. 1, 2 and 4 to 6 each show a detailed view of the particular filter element.

Figure 1:
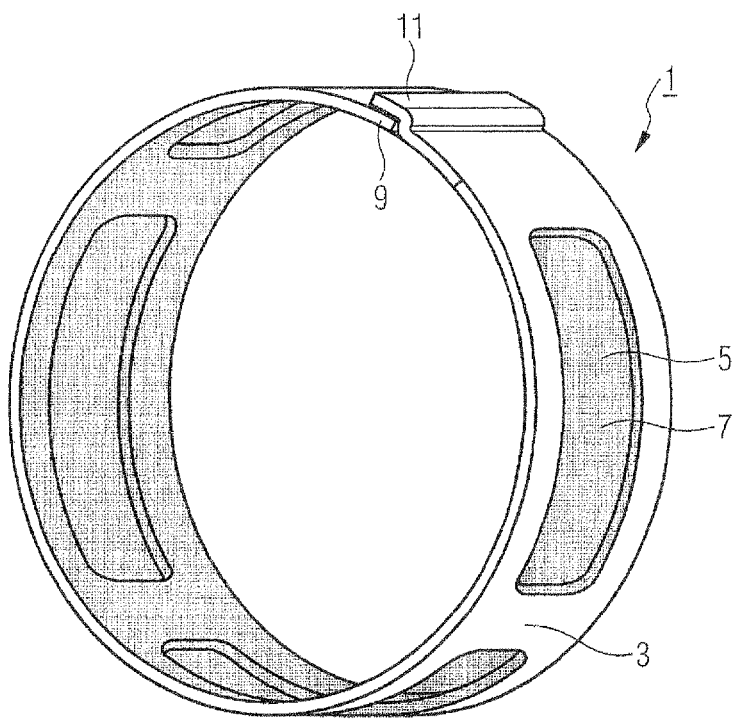
FIG. 1 shows a three-dimensional illustration of a filter element with a welded gripping frame, and the filter element in a longitudinal section, and a detailed view.
Figure 1:
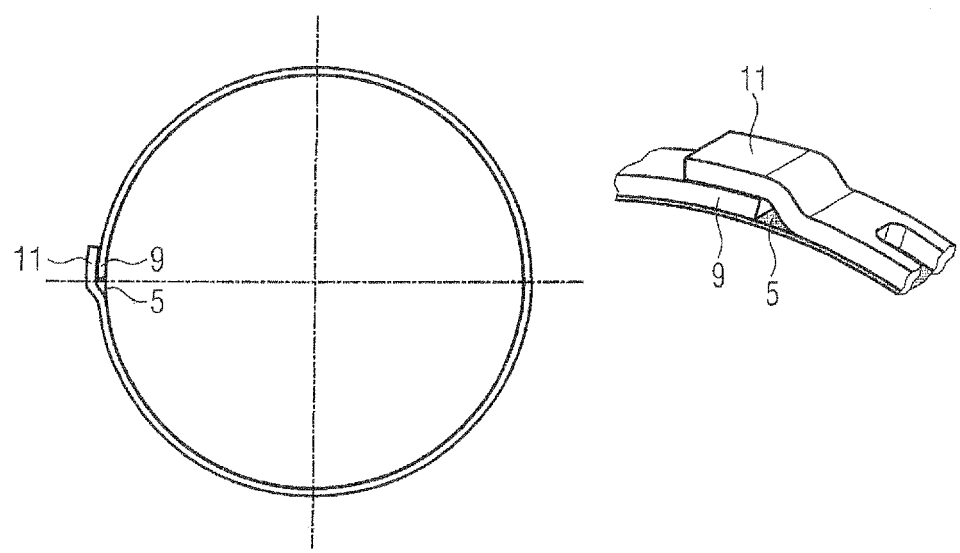
Figure 2:
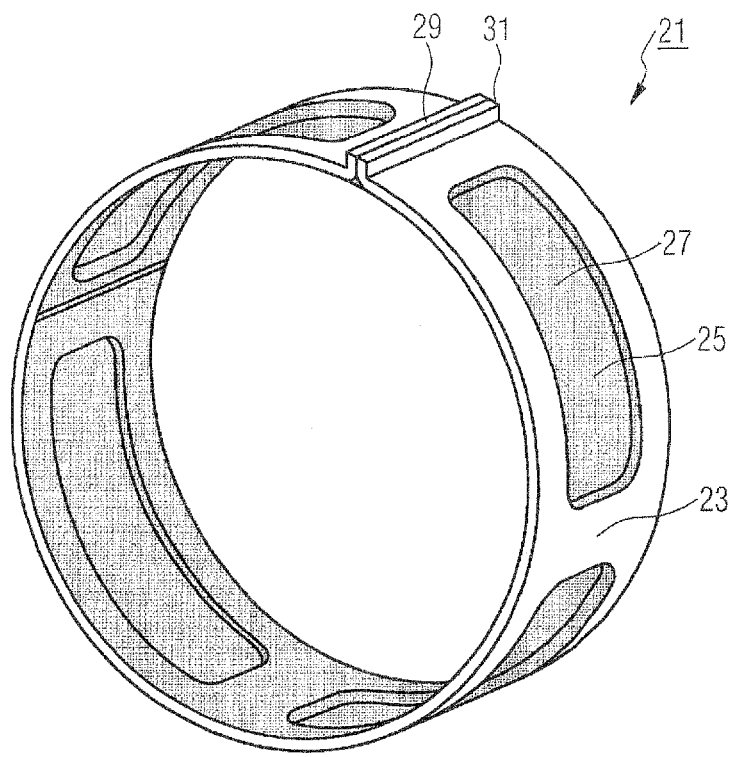
FIG. 2 shows a three-dimensional illustration and a detailed view of a filter element with a welded gripping frame.
Figure 2:
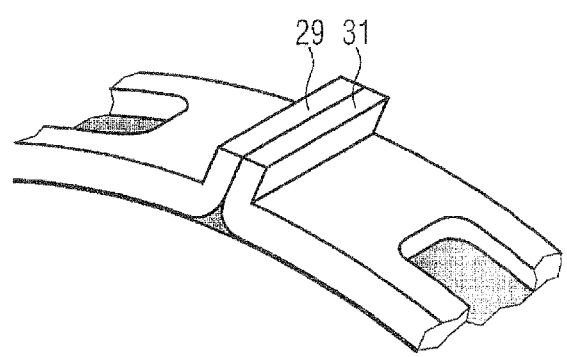
Figure 3:
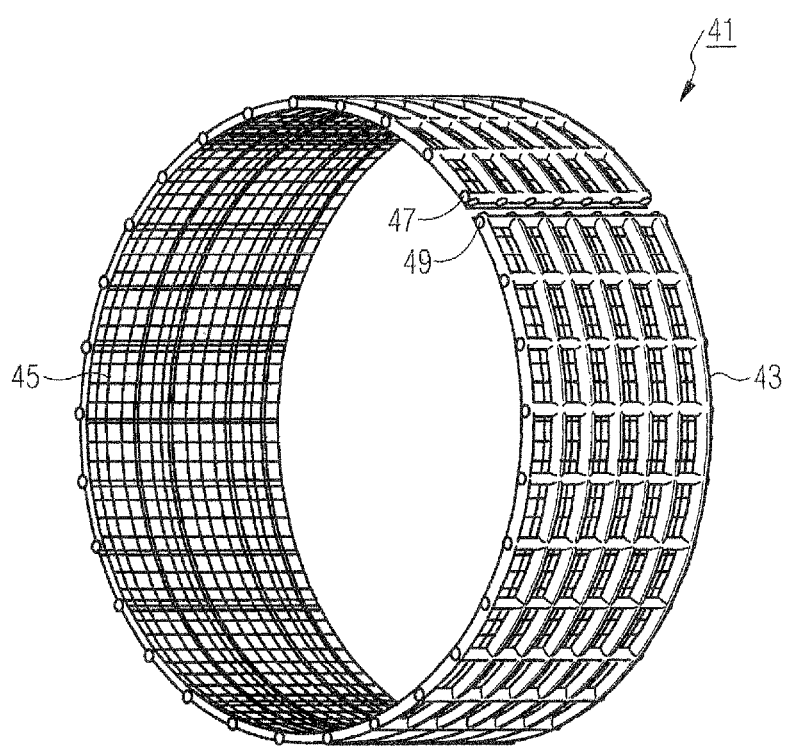
FIG. 3 shows a three-dimensional illustration and a detailed view of a filter element with a welded gripping frame.

FIGS. 1 to 3 each show a filter element 1, 21, 41 with a welded gripping frame 3, 23, 43. The gripping frames 3, 23 according to FIGS. 1 and 2 are designed here as metal clips with openings 5, 25. Respective fine-meshed annular filter fabrics 7, 27 for filtering the dirt particles are retained in the gripping frames 3, 23.

Figure 7:
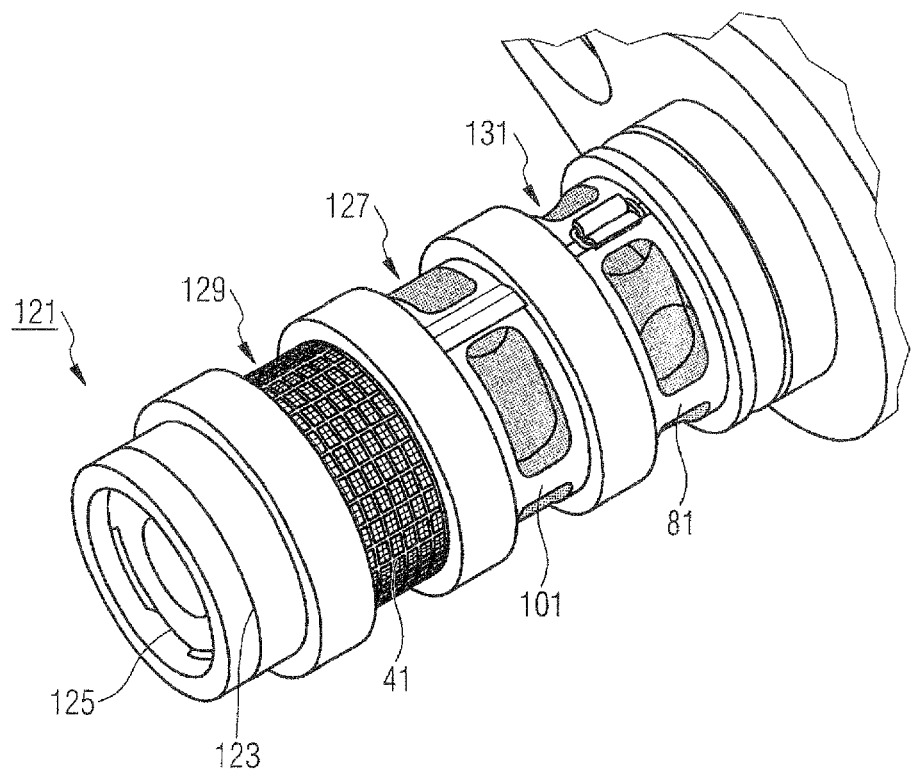
FIG. 7 shows a control valve with three different filter elements.

The gripping frame 3 from FIG. 1 is designed here with two ends 9, 11 which overlap in the circumferential direction. This can readily be seen particularly in the longitudinal section and in the detailed view. The prestress of the gripping frame 3 is adjusted via the overlap and is of a magnitude sufficient for the gripping frame 3 to be adjusted via the overlap and is of a magnitude sufficient for the gripping frame 3 to be securely retained on a control valve, as shown in FIG. 7.

The gripping frame 23 from FIG. 2 is designed with two ends 29, 31 which extend outward. The ends 29, 31 are also connected to each other by means of a welding process. The gripping frame 23 here has per se a reduced diameter in comparison to the control valve, thus resulting in the retaining function after the welding operation.

FIG. 3 shows a welded coarse fabric gripping of an annular filter fabric 45 by means of a gripping frame 43. The gripping frame 43 is designed as a metallic coarse fabric, the mesh size of which is larger than the mesh size of the very fine-meshed annular filter fabric 45 attached within the gripping frame 43. The gripping frame 43 is connected to the annular filter fabric 45 and therefore performs a support function for the annular filter fabric 45. By means of the connection of the two parts, the gripping frame 43 and the annular filter fabric 45 can be attached together on a control valve in one installation step. After attachment to a control valve, the respective ends 47, 49 of the gripping frame 3 can be connected to each other by welding, as the gripping frames 3, 23 already have been, and therefore the annular filter fabric 45 is braced in a planar manner.

Figure 4:
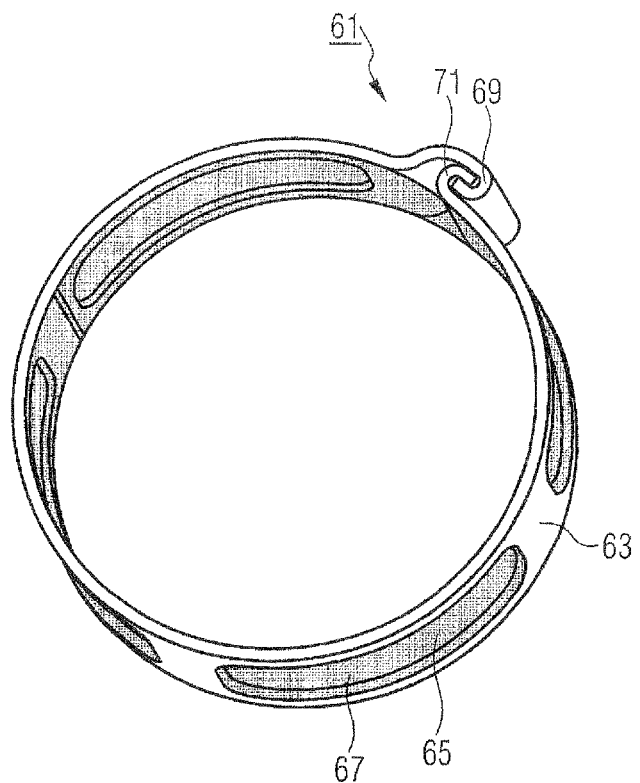
FIG. 4 shows a three-dimensional illustration and a detailed view of a filter element with an interlocked gripping frame.
Figure 4:
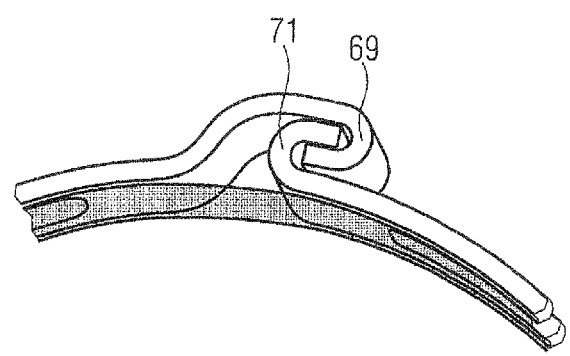

FIG. 4 shows a filter element 61 which has a metallic gripping frame 63 and a fine-meshed annular filter fabric 65 arranged within said gripping frame 63. The gripping frame has four openings 67 through which oil can pass via a feedline (not shown) into a control valve. The gripping frame 63 has two ends 69, 71 which extend in the circumferential direction and are interlocked. For this purpose, the one end 69 is bent over radially inwards and the end 71 is bent radially outwards. The ends cannot be released from each other when the clip is fitted because of the stress of the gripping frame 63.

Figure 5:
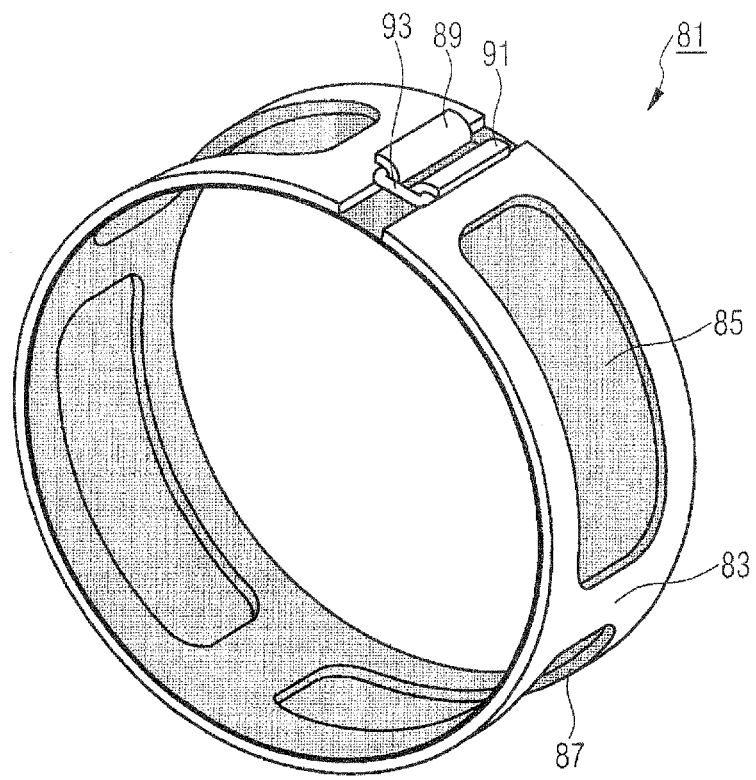
FIG. 5 shows a three-dimensional illustration and a detailed view of a filter element with a gripping frame, which is closed by means of a wire clip.
Figure 5:
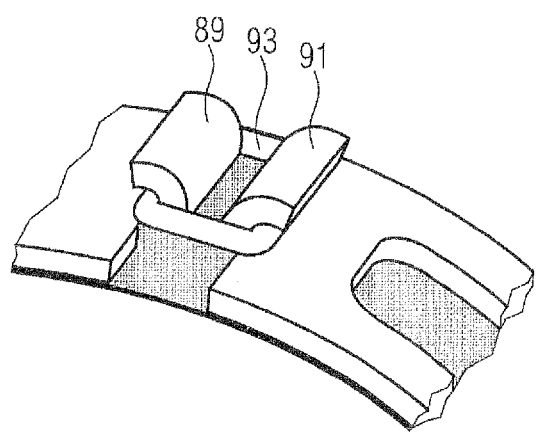

FIG. 5 shows another option for fastening a filter element 81. As also in FIG. 4, the filter element 81 consists of a gripping frame 83 and a fine-meshed annular filter fabric 85. The gripping frame 83 likewise has openings 87 and two ends 89, 91 which extend in the circumferential direction. In contrast to FIG. 4, the ends 89, 91 of the gripping frame 81 are both bent radially outwards and fastened to each other via a fastening means in the form of a wire clip 93. The wire clip 93 surrounds the bent-over ends 89, 91 of the gripping frame and thereby holds said ends firmly together. The gripping frame 83 is prestressed as a result. As also in FIG. 4, the connection of the ends 89, 91 can be released when the wire clip 93 is removed.

Figure 6:
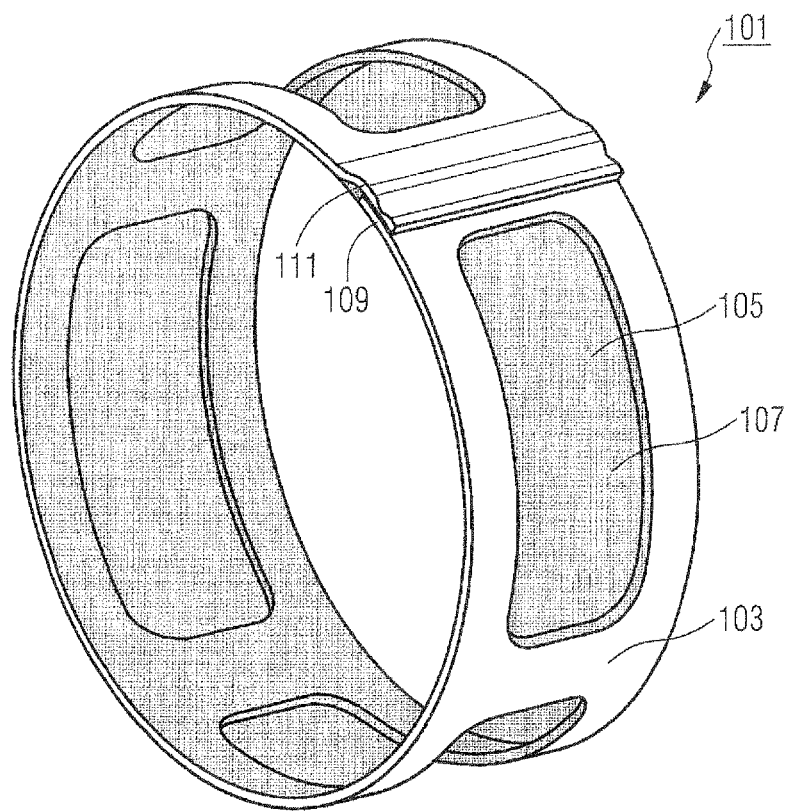
FIG. 6 shows a three-dimensional illustration of a filter element with a caulked gripping frame.
Figure 6:
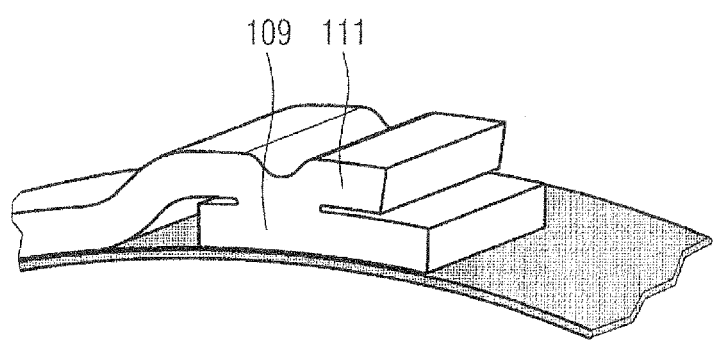

FIG. 6 shows a filter element 101 with a metallic gripping frame 103 and a fine-meshed annular filter fabric 105. The gripping frame 103 has openings 107 through which the annular filter fabric 105 is available for filtering the particles out of the oil. The two ends 109, 111 of the gripping frame 103 overlap in the circumferential direction and are caulked to each other by means of plastic deformation with the gripping frame 103 being prestressed.

FIG. 7 shows a control valve 121 for a camshaft adjuster. The control valve 121 has a tubular valve housing 123 and a piston which is positioned within a valve opening 125 and which cannot be seen because of the illustration. The control valve 121 is designed as a proportional valve which is connected to the oil pump and return and to the two pressure chambers of the camshaft adjuster.

The control valve 121 has a radial passage opening 127 for supplying oil and two other connections 129, 131 for connection to the pressure chambers of a camshaft adjuster. The connections 129, 131 and the passage opening 127 are provided in the valve housing 125 in the form of bores. The connections 129, 131 each serve to charge a separate pressure chamber.

Filter elements 41, 81, 101 according to the exemplary embodiments of FIGS. 3, 5 and 6 are arranged in FIG. 7 over the passage opening 127 and the two respectively adjacent connections 129, 131. The three different filter elements 41, 81, 101 are arranged here on a control valve 121 merely for illustrative purposes. In practice, only one embodiment of a filter element 1, 21, 41, 61, 81, 101 will be used in each case for a control valve 121.

Each of the three filter elements 41, 81, 101 shown in FIG. 7 is arranged radially around the control valve. The filter element 101, the ends 109, 111 of which are caulked to each other, is arranged radially around the passage opening 127. A filter element 41, the ends 47, 49 of which are welded to each other, is arranged around the connection 129. The connection 131 is surrounded radially by the filter element 81, the ends 89, 91 of which are connected to each other by the wire clip 93.

The gripping frames 43, 83, 103 of all three filter elements 41, 81, 101 which are positioned on the control valve 121 respectively brace an annular filter fabric 45, 85, 105, which is arranged on the inner circumference of said filter elements, on the valve housing 123.

LIST OF REFERENCE NUMBERS

1 Filter element
3 Gripping frame
5 Annular filter fabric
7 Opening
9 End
11 End
21 Filter element
23 Gripping frame
25 Annular filter fabric
27 Opening
29 End
31 End
41 Filter element
43 Gripping frame
45 Annular filter fabric
47 End
49 End
61 Filter element
63 Gripping frame
65 Annular filter fabric
67 Opening
69 End
71 End
81 Filter element
83 Gripping frame
85 Annular filter fabric
87 Opening
89 End
91 End
101 Filter element
103 Gripping frame
105 Annular filter fabric
107 Opening
109 End
111 End
121 Control valve
123 Valve housing
125 Opening
127 Passage opening
129 Connection
131 Connection

The invention claimed is:
1. A filter element for a control valve of a camshaft adjuster, comprising:
an annular filter fabric for extracting particles; and a retaining frame for fastening the filter fabric, the retaining frame being a gripping frame having a circumferential inner surface disposed radially outside of the annular filter fabric and configured for planar bracing of the annular filter fabric on a circumferential outer surface of the control valve, such that the annular filter fabric is clamped between the circumferential inner surface of the retaining frame and the circumferential outer surface of the control valve when the filter element is mounted on the control valve, the annular filter fabric and the gripping frame being separate elements such that a retaining function of the filter element is decoupled from a filter function of the filter element, the annular filter fabric extending continuously along the circumferential inner surface of the retaining frame such that the annular filter fabric forms an innermost surface of the filter element for contacting the control valve continuously along the circumferential outer surface of the control valve, the gripping frame including two ends connectable to attach the annular filter fabric and the gripping frame to the control valve, the annular filter fabric and the gripping frame being separate elements releasably connected to each other.

2. The filter element according to claim 1, wherein the gripping frame is substantially annular and the two ends extend in a circumferential direction and are interlockable.

3. The filter element according to claim 2, wherein the filter fabric extends annularly from one of the two ends of the gripping frame to the other of the two ends of the gripping frame at a location the two ends are interlockable.

4. The filter element according to claim 1, further comprising a fastening element, the gripping frame being substantially annular and two ends extending in a circumferential direction and being connectable to each other by the fastening element.

5. The filter element according to claim 1, wherein the gripping frame is substantially annular and the two ends extend in a circumferential direction and are caulkable to each other.

6. The filter element according to claim 1, wherein the gripping frame is substantially annular and the two ends extend in a circumferential direction and are weldable to each other.

7. The filter element according to claim 1, wherein the gripping frame is a metallic clip with a circumference having a number of openings.

8. The filter element according to claim 1, wherein the annular filter fabric is a mesh and the gripping frame is a metallic mesh with a mesh size which is wider than the mesh of the annular filler fabric.

9. The filter element according to claim 1, wherein the gripping frame and the annular filter fabric and not fixedly connected to each other.

10. A control valve for a camshaft adjuster, comprising:

a tubular valve housing having a radial hydraulic fluid passage opening, and a filter element, which has an annular filter fabric for extracting particles and a retaining frame for fastening the filter fabric, the retaining frame being a gripping frame and being disposed radially outside of the filter fabric; and a control piston arranged in the valve housing, wherein the gripping frame has a circumferential inner surface disposed radially outside the annular filter fabric and configured for planar bracing of the annular filter fabric on a circumferential outer surface of the valve housing, the annular filter fabric and the gripping frame being separate elements, such that a retaining function of the filter element is decouple from a filter function of the filter element, the annular filter fabric extending continuously along the circumferential inner surface of the retaining frame such that the annular filter fabric faints an innermost surface of the filter element for contacting the valve housing continuously along the circumferential outer surface of the valve housing, the gripping frame including two ends connected together to attach the annular filter fabric and the gripping frame to the valve housing, the annular filter fabric and the gripping frame being separate elements releasably connected to each other on the valve housing.

11. The control valve according to claim 10, wherein the releasable connection of the gripping frame and the annular filter fabric is formed by the annular filter fabric being positioned on the control valve first and then embraced by the gripping frame.

12. The control valve according to claim 10, wherein the gripping frame and the annular filter fabric and not fixedly connected to each other.

* * * * *